(No Model.)

F. H. TREAT.
BILLET SHEARS.

No. 445,294. Patented Jan. 27, 1891.

Witnesses:

Inventor:
Francis H. Treat
By Banning & Banning & Payson,
Att'ys

UNITED STATES PATENT OFFICE.

FRANCIS H. TREAT, OF CHICAGO, ILLINOIS, ASSIGNOR TO THE ILLINOIS STEEL COMPANY, OF SAME PLACE.

BILLET-SHEARS.

SPECIFICATION forming part of Letters Patent No. 445,294, dated January 27, 1891.

Application filed August 16, 1890. Serial No. 362,203. (No model.)

*To all whom it may concern:*

Be it known that I, FRANCIS H. TREAT, of Chicago, Cook county, Illinois, have invented a new and useful Improvement in Billet-Shears, of which the following is a specification.

The object of my invention is to provide for cutting two billets at a time and for stopping or holding one of the billets on the receiving-table until the other can pass in ahead of it onto the conveyer; and the invention consists in the features and combinations hereinafter described and claimed.

Figure 1:
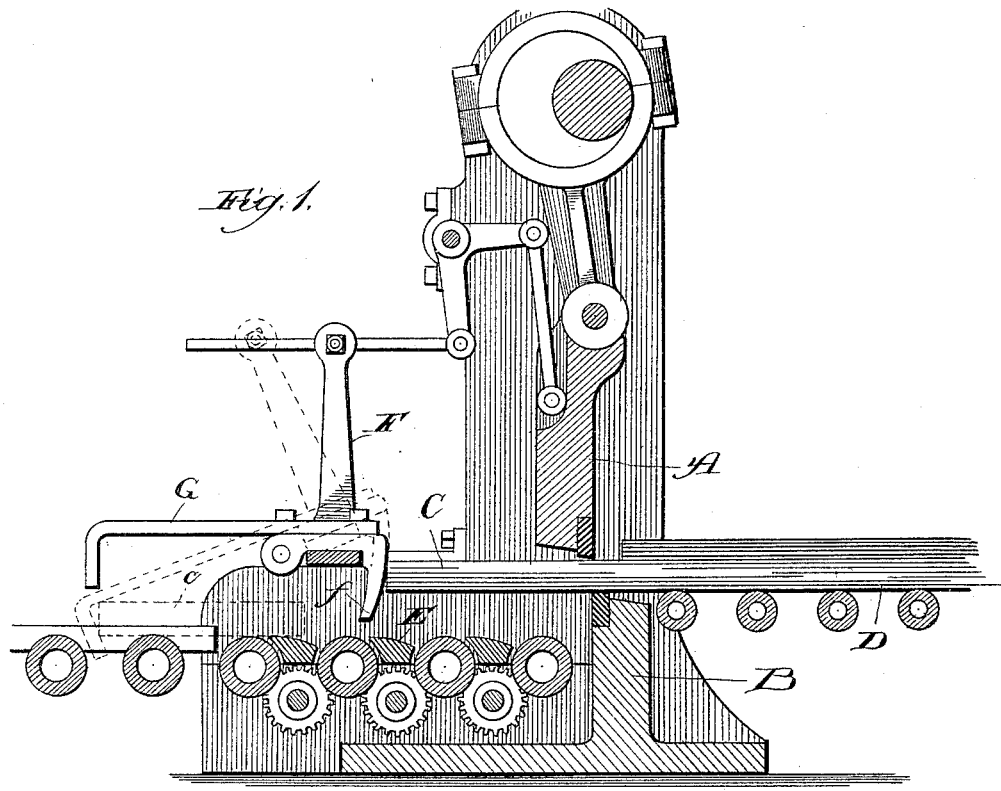
Figure 2:
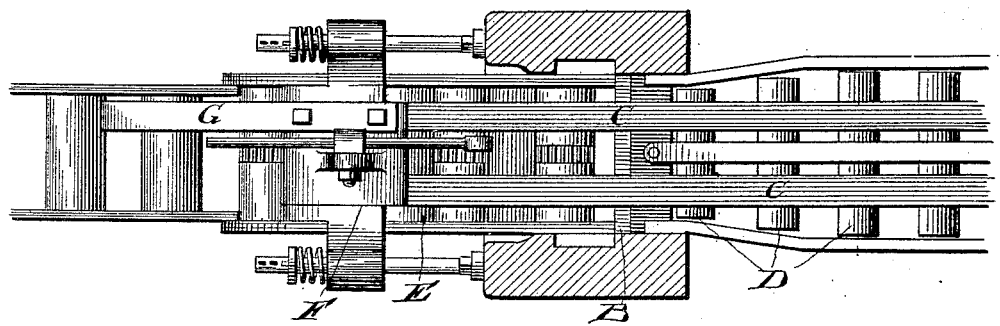

In the accompanying drawings, Figure 1 is a side elevation of a billet-shears containing my improvements, and Fig. 2 is a plan view of the same.

A is the movable knife of the shears; B, the stationary knife thereof; C, the billet in position to be sheared, and c a cut-off billet passing forward to the conveyer; D, a table for feeding the billet into the shears; E, a table for receiving the billets and carrying them away from the shears; F, an automatic adjustable stop for gaging the length of the billets, and f a downwardly-projecting portion thereof, and G a hook attached to the stop for holding back one of the billets.

In order to shear small billets economically, it is desirable that the shear mechanism be so arranged as to be capable of operating continuously and cutting off the billets very rapidly; but as now ordinarily constructed the shears are practically only capable of shearing one billet at a time. In part this is due to the facts that the long conveyers used for carrying the billets to their place of delivery are only wide enough to receive and carry one billet at a time, or rather a train of billets in single file, and that if more than one billet should be sheared at a time there is no proper stop mechanism to hold one back until the other can pass forward onto the billet-conveyer. In the absence of such stop mechanism there is no way to prevent the billets from crowding and clogging the conveyer.

To enlarge the capacity of the shears, so as to enable them to cut two billets at a time, I provide for stopping one of the billets as soon as it is cut off and for holding it on the receiving-table on which it falls until its companion billet, cut off at the same time, can pass forward and take position in advance on the conveyer, after which the billet held in check is released and allowed to move forward.

In constructing my improved stop mechanism I place a bar across the table above the rollers, and to this bar I pivot a stop, preferably in the form shown. When in its normal position the lower end of this stop, which I call a "downwardly-projecting portion," extends down lower than the under side of the bloom being cut into billets and close enough to the rollers to prevent the cut billet from passing under it and between it and the rollers. This downwardly-projecting portion of the stop is preferably wide enough to extend across the table in front of both blooms, so as to catch and stop both as soon as they are in position to be cut. Its position is such that it stops the blooms at the proper point to enable the billets to be cut off of exactly the length desired. The downward movement of the shears operates through a system of crank mechanism to raise the downwardly-projecting portion of the stop and at the same time depress the hook portion. The downwardly-projecting portion thus rising as the shear-knife goes down reaches its highest point about the time the billet is severed and ready to fall on the receiving-table. As the downwardly-projecting portion rises the cut billets move forward under it; but the hook being lowered one of the billets is again caught before it finally leaves the table to pass onto the conveyer. This is due to the fact that when the downwardly-projecting portion is raised to its highest position the hook which goes down as the projecting portion rises is down low enough to catch the billet in whose line of travel it is arranged. The billet thus caught is of course held by the hook until the shear-knife rises and, through the crank mechanism above suggested, lowers the downwardly-projecting portion of the stop and elevates its hook portion.

As already suggested, the movements of the stop mechanism are so timed with reference to the shears as to be in position to catch the end of the bloom at exactly the time the shear-knives are open wide enough to permit its passage between them into position to be cut and to rise out of the way of the billets in time to enable them to pass forward as soon as severed and before another cutting. The movements of the stop mechanism and shears being thus timed with reference to each other and the rollers of the table bringing the bloom into position to be sheared, and of the table carrying the cut billets away revolving continuously, it is apparent that the up and down movements of the shears and stop mechanism will go on continuously and without interruption for any length of time desired. This continuous movement of the shears enables them to cut many more billets in a given time than is possible with shears not so operating. The stop mechanism operating to hold the billets and regulate their passage onto the conveyer also enables the shears to cut two billets at a time, thus doubling their capacity.

As the essential feature of my invention consists in providing a billet-shears with stop mechanism, it will of course be understood that I do not intend to limit myself to minor features or details of construction. On the contrary, I intend to vary the construction of the parts, to omit any of them desired, or to use equivalent members, as circumstances may suggest or render expedient.

I claim—

1. In combination with a billet-shears, stop mechanism above the receiving-table, substantially as described.

2. In combination with a billet-shears, stop mechanism comprising a downwardly-projecting portion pivoted to a cross-bar, substantially as described.

3. In combination with a billet-shears, stop mechanism comprising a downwardly-projecting portion pivoted to a cross-bar and a hook secured to the pivoted portion to move therewith, substantially as described.

4. In combination with a billet-shears, stop mechanism above the receiving-table secured by crank mechanism to the shear-knife, whereby the stop mechanism and knife may be operated in unison, substantially as described.

5. In a billet-shears, the combination of a shear-knife long enough to cut two billets and stop mechanism to stop the blooms and prevent the billets from crowding the conveyer, substantially as described.

FRANCIS H. TREAT.

Witnesses:
EPHRAIM BANNING,
SAMUEL E. HIBBEN.